Sept. 1, 1942.                J. F. BECHTLE                2,294,650
                              WELDING METHOD
                            Filed Nov. 9, 1940
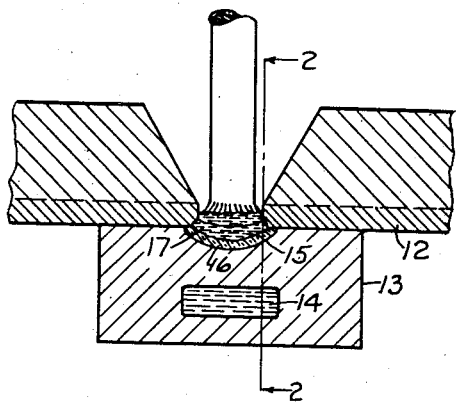
FIG. 1.
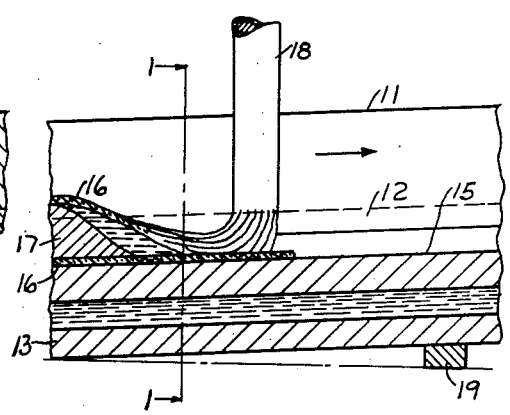
FIG. 2.
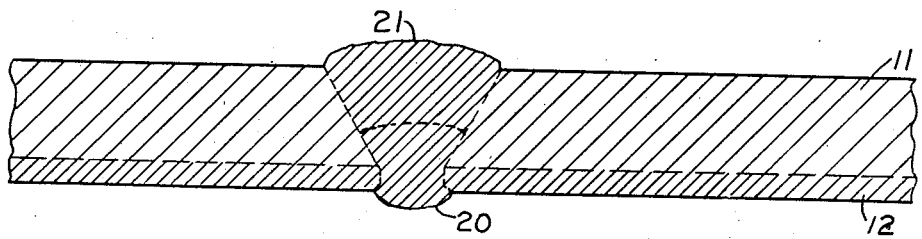
FIG. 3.
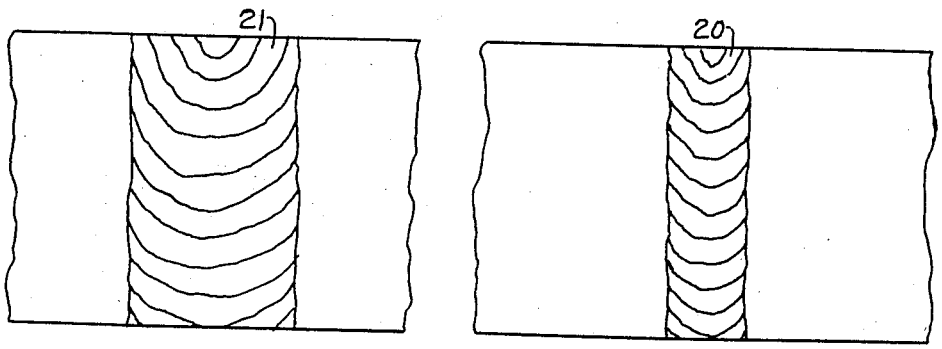
FIG. 4.                    FIG. 5.
JOSEPH F. BECHTLE,
INVENTOR
BY *Virgil F. Davico*
ATTORNEY Patented Sept. 1, 1942

2,294,650

UNITED STATES PATENT OFFICE 2,294,650

WELDING METHOD

Joseph F. Bechtle, Jersey City, N. J., assignor to The M. W. Kellogg Company, New York, N. Y., a corporation of Delaware Application November 9, 1940, Serial No. 364,977

7 Claims. (Cl. 219—10)

This invention relates to seam welding and particularly to that type of seam welding in which the joint is produced by depositing molten filler metal and coalescing it with the metal of the edges to be joined.

Under the present practice when a welded seam is produced by depositing molten filler metal and coalescing the filler metal with the metal of the edges of the article and the welding is performed entirely from one side, the back of the joint, even if a chill is used, is not equal in quality and strength to the front of the joint. In order to make the backs of such joints substantially equal in quality and strength to the fronts of such joints, it is common practice to chip out, or otherwise remove, metal from the back of the joint until sound metal is reached and then to fill the resulting groove with filler metal. When the article is made of a composite metal, for instance, a composite having a carbon steel base armored with a depth of corrosion resistant alloy, and, as is usually the case, the alloy is on the inside of the article, it is always necessary to chip out the back of the joint and to fill the resultant groove. This must be done to assure a full depth of solid alloy at the back of the joint.

The chipping and welding at the back of the joint not only add materially to the cost of the weld but also impose a limitation on the size of the article that can be welded as obviously the article must be of a size sufficient to render the back of the weld accessible for the chipping and welding operations.

I have found that joints having their backs at least equal in quality and strength to their fronts can be produced by welding entirely from one side of the seam.

It is an object of this invention to provide a method for welding seams in articles made of homogeneous metal, as well as in articles made of composite metal, in which the welding is performed entirely from one side of the seam and the back of the resulting joint is at least equal in quality and in strength to the front of the joint.

It is also an object of this invention to provide a method for welding seams in articles made of homogeneous metal, as well as in articles made of composite metal in which the welding is performed entirely from the front of the seam regardless of the size of the article and the back of the resulting joint is at least equal in quality and in strength to the front of the joint.

It is a further object of this invention to provide a method for welding seams in articles in which the welding is carried on from the front of the seam against a mold positioned at the back of the seam and during the welding a molten metal pool is produced in the mold and the edges to be joined are coalesced with the metal of the pool.

It is a still further object of the invention to provide a method for welding seams in articles in which the welding is carried on from the front of the seam against a metal mold positioned at the back of the seam and during the welding a molten metal pool is produced on a thickness of flux in the mold and the edges to be joined are coalesced with the metal of the pool.

The further objects and advantages of the invention will be apparent from a consideration of the following description of a preferred mode of carrying the invention out in practice taken with the accompanying drawing, in which, Fig. 1 is a sectional view, taken on line 1—1 of Fig. 2, illustrating the novel method, Fig. 2 is a sectional view, taken along the line of movement of the electrode, illustrating the manner in which the bottom overlay bead is produced, Fig. 3 is a cross sectional view of a finished joint, Fig. 4 is a plan view of a finished joint, and Fig. 5 is a bottom view of a finished joint.

The novel method may be employed for welding seams in articles made up of homogeneous metal or it may equally well be used for welding seams in the articles made up of composite metal. For the purposes of this disclosure the novel method will be disclosed in connection with the welding of seams in composite metal articles.

It is now common practice to employ composite metal made up of a carbon, or low alloy, steel base which is armored by a depth of alloy having special properties such as, high corrosion resistance, etc., in the manufacture of pressure vessels and similar apparatus which handle or in which are processed corrosive media. The alloy of special analysis is almost invariably on the inside of the apparatus.

To produce such an apparatus, for instance the pressure vessel a part of which is shown in the drawing, the composite metal in sheet or in plate form is formed and shaped as in the usual practice. The usual composite metal for pressure vessels is made up of base metal 11 of carbon, or low alloy, steel to which is united a layer of armoring metal 12 of alloy of special properties in the intended service. Corrosion resisting alloys such as the austenitic chromenickel-iron alloys, 18-8, 25-20 etc., and the chrome-iron alloys, 12-14 chrome etc., are commonly used as armoring metal 12.

During the forming and shaping of the composite metal the edges to be joined are formed into the component parts of welding grooves. Any preferred shape of groove may be used. Also, when the metal is of light gage, as well as under other conditions, the edges may merely be squared.

The edges to be joined are then positioned on metal chill 13 as shown in Fig. 1. Chill 13 is preferably of copper but it may be made of any metal, or other material, having a sufficient heat conducting capacity to produce the desired results. Chill 13 is provided with a passageway 14 through which water, or other cooling medium, may be circulated when the heat generated during welding is such that cooling of chill 13 is necessary. When the welding heat is comparatively low chill 13 need not be cooled and passageway 14 may be eliminated. Chill 13 also includes a groove 15. Groove 15 is of such width and depth as to contain within it a depth of flux or slag 16 and the weld metal 17 required to properly unite the edges and seal the joint and to produce a reenforcing overlay of metal.

The edges to be joined are not brought into close contact as in the prior practice but are spaced as shown. The spacing between the edges must be great enough to allow the electrode 18 to pass between them to strike an arc off a molten pool in groove 15 and yet small enough to assure fusion of the edges. When the electrode 18 includes a comparatively thick flux coating the space between the edges need not be much greater than the diameter of the electrode but when the electrode is bare or it has only a thin coating the spacing should be great enough to preclude unwanted arcing between the electrode and the edges. The space between the edges may be quite small; the edges may even touch as when the welding energy used is sufficient to fuse through the floor of the welding groove and produce a molten pool in groove 15 accessible to the electrode. However, for dependable results the spacing of the edges as shown is preferred.

After the edges are positioned as in Fig. 1 they may be joined by spaced tack welds, or other expedients may be used, to hold them in the predetermined spaced relation during welding. Connections are then made to the welding circuit in the ordinary way. If the electrode used does not include a coating that will provide a sufficient depth of flux 16 on the floor of groove 15, a sufficient quantity of powdered flux is deposited in groove 15 prior to welding. The electrodes used for welding 18-8, 25-20 etc., usually include a sufficient flux coating.

The welding is started by striking an arc off one end of the edges or off a piece of metal placed in groove 15 for this purpose. When a sufficient pool of molten metal is formed electrode 18 is moved along groove 15 in the direction shown by the arrow in Fig. 2. The arc fuses metal of the electrode, metal of both of the edges, the flux of the electrode coating and the flux in groove 15, when flux is placed in groove 15. Some of molten flux 16 spreads out and covers the surface of groove 15 and solidifies due to the chilling action of chill 13, or at least becomes sufficiently viscous to remain on the surface of groove 15. The flux on the surface of groove 15 forms a smooth surfaced lining of substantially uniform thickness which assures an even and smooth surfaced deposit of weld metal. The molten metal forms a pool on the surface of the solidified, or partly solidified, flux 16, fills the remainder of groove 15 and unites the fused edges. The remainder of the flux forms a protective coating on the surface of the metal pool and protects it from the atmosphere. Electrode 18 is moved along the groove at such a rate that the arc, as shown in Fig. 2, is kept somewhat ahead of the molten metal pool and the molten flux 16 leads the molten metal so that the molten flux 16 may have the opportunity to cover the surface of groove 15. When the welding is performed by hand the operator may at times oscillate electrode 18 as required to assure continuous fusion of both of the edges; when the operation is performed by means of automatic welding apparatus the edges to be joined must be properly spaced or electrode 18 oscillated as it moves along the groove. To prevent undercutting I find it advisable to so arrange the work, as by positioning block 19 under one end of chill 13, that the electrode 18 travels up hill. The degree of incline required is best determined by experiment.

When the metal welded is of comparatively light gage a single traverse of electrode 18 may be sufficient to completely fill the joint. When the metal welded is thick two or more traverses of electrode 18 may be required. The first traverse is carried on as above described in order to obtain the novel results of this invention, the subsequent traverses may be carried out in any preferred manner.

The weld metal 17 produced by the first traverse of electrode 18 is made up mainly of metal supplied by electrode 18 and alloy lining 12. Hence, since there is but little dilution due to metal of base 11, electrode 18 need only slightly exceed alloy lining 12 in alloy constituents in order to produce a weld metal 17 of the same analysis as alloy lining 12. The subsequent traverse, or traverses, may be performed with electrodes of the same analysis as those used in the first traverse or they may be performed with electrodes of different analysis. It is to be noted that even if carbon steel electrodes are used for the second and subsequent traverses the analysis of the metal uniting the edges of the alloy lining 12 will not be affected so long as the welding is carried out properly.

Since all of the welding is performed from one side the novel method may be used in welding articles of any shape or size. The novel method is especially useful in welding small pipe or other tubular members or shapes that are too small in diameter or size to allow entry of a welder or a welding machine.

After the welding is completed and chill 13 is removed an examination of the back of the joint will show a bottom overlay bead 20 that is much smoother and more regular in appearance and contour than the usual top overlay bead 21. The edges of bead 20 merge throughout into the lining metal 12 so that bead 20 provides a continuous bridge of sound alloy metal at the joints in the lining metal 12.

Bottom overlay bead 20, when the joint is formed by several traverses of electrode 18, is also of stronger and finer grained metal than is top overlay bead 21 when top overlay bead is of the same analysis. This is due to the high type of heat treatment that bead 20 receives during the deposition of the subsequently deposited weld metal. Bottom overlay bead 20 because of the heat treatment just mentioned is always superior in quality and strength to the bottom overlay beads of the prior art that are deposited after the main groove has been filled.

While the novel method has been disclosed in connection with electric arc welding it is not limited to the use of the electric arc as other sources of welding heat for instance, the oxygen-combustible gas flames etc., may equally well be used.

I claim:

1. In the method of seam welding metal articles the steps comprising, positioning a pair of the edges of the article to be joined over a groove in a metal mold piece, providing a lining of molten flux to cover the surface of the groove, filling the lined groove with molten metal while maintaining the flux lining on the surface of the groove and coalescing the molten metal in the groove with the metal of the edges.

2. In the method of seam welding metal articles the steps comprising, positioning the metal of the article on a chill member with a pair of the edges to be joined spaced from each other and overlying a groove in the chill member, supplying solid filler metal to the groove through the space between the edges, providing a continuous coating of molten flux on the surface of the groove, and filling the lined groove and the bottom of the space between the edges with molten metal by fusing the filler metal and metal of both of the edges while maintaining the flux coating on the surface of the groove.

3. In the method of seam welding metal articles the steps comprising, positioning the metal of the article on a metal chill member with a pair of the edges to be joined spaced from each other and overlying a groove in the chill member, supplying solid filler metal and flux to the groove through the space between the edges and fusing the flux, the filler metal and metal of both of the edges to the bottom thereof to line the groove with a continuous coating of molten flux and to fill the lined groove and the bottom of the space between the edges with molten metal while maintaining the flux coating on the surface of the groove.

4. In the method of seam welding metal articles the steps comprising, positioning the metal article on a metal chill member with a pair of the edges to be joined spaced from each other and overlying a groove in the chill member, depositing flux in the particle form in the groove, supplying filler metal to the groove through the space between the edges, fusing the flux in the groove to cover the surface of the groove with a continuous covering of flux and simultaneously fusing filler metal and metal of the edges to fill the flux covered groove and the bottom of the space between the edges with molten metal.

5. In the method of seam welding metal articles the steps comprising, forming a pair of the edges to be joined into the component parts of a welding groove, positioning the article on a metal chill member with said edges spaced from each other and overlying a groove in said chill member, placing a flux covered metal electrode in said space between said edges, striking an electric arc in the bottom of said space and in said groove from the end of said electrode to fuse the metal electrode, the flux covering thereof and metal of said edges to the bottom thereof to cover the surface of said groove with fused flux and to fill said flux covered groove and the bottom of said space with a continuous deposit of dense weld metal.

6. In the method of seam welding metal articles the steps comprising, forming a pair of the edges to be united into the component part of a welding groove, positioning the article on a metal chill member with said edges spaced from each other and overlying a groove in said chill member, placing a fusible metal electrode in the space between said edges, striking an electric arc in the bottom of said space between said edges and in said groove in said chill member to fuse metal of said electrode and metal of each of said edges into a common molten mass, said edges being fused to the bottom thereof, supplying flux to said arc to be fused simultaneously with said metals to provide a molten mass of flux that covers the molten metal mass and extends in said groove beyond the molten metal mass, and progressing said electrode along the seam at a rate to maintain molten flux ahead of the molten metal mass to line said groove in said chill member with molten flux and to fill said flux lined groove in said chill member and the bottom of said space with the molten metal mass.

7. In the method of seam welding metal articles made up of composite metal which includes a base metal armored by a depth of protective metal, the steps comprising, forming a pair of the edges to be united into the component parts of a welding groove by removing base metal, positioning the armored side of the article on a chill member with said edges overlying a groove in said chill member and spaced from each other an amount sufficient to permit an electrode to pass between them, placing a flux covered electrode in the space between said edges, striking an electric arc in the bottom of said space and in said groove in said chill member to fuse metal of the electrode and metal of the sides of said space into a common molten metal mass and to fuse the flux coating of said electrode into a molten flux mass which covers the molten metal mass and extends beyond it in said groove in said chill member and progressing said electrode along the seam to maintain the molten flux ahead of the molten metal and to fill said space and said groove in said chill member with molten metal whereby a continuous depth of fused flux is interposed between the molten metal and the surface of said groove in said chill member, said electrode being of a composition to produce a pool of molten metal of substantially the same analysis as said depth of protective metal.

JOSEPH F. BECHTLE.